(12) United States Patent
Niwa et al.

(10) Patent No.: US 10,885,784 B2
(45) Date of Patent: Jan. 5, 2021

(54) DRIVING SUPPORT DEVICE AND CONTROL METHOD OF DRIVING SUPPORT DEVICE

(71) Applicant: TOYOTA JIDOSHA KABUSHIKI KAISHA, Toyota (JP)

(72) Inventors: Takuto Niwa, Toyota (JP); Kazuki Mitsui, Toyota (JP); Yuuki Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 16/127,952

(22) Filed: Sep. 11, 2018

(65) Prior Publication Data

US 2019/0080606 A1    Mar. 14, 2019

(30) Foreign Application Priority Data

Sep. 13, 2017 (JP) .................. 2017-176160

(51) Int. Cl.
*G08G 1/16* (2006.01)
*G01S 13/93* (2020.01)
(Continued)

(52) U.S. Cl.
CPC ........... *G08G 1/164* (2013.01); *B60R 21/013* (2013.01); *B60W 30/00* (2013.01); *B60W 50/00* (2013.01); *G01S 7/4026* (2013.01); *G01S 13/93* (2013.01); *G01S 13/931* (2013.01); *G08G 1/166* (2013.01); *B60R 2021/0004* (2013.01); *G01S 2007/403* (2013.01); *G01S 2007/4034* (2013.01);
(Continued)

(58) Field of Classification Search
CPC ....... G08G 1/164; G08G 1/166; B60W 30/00; B60W 30/09; B60W 50/00; B60W 40/00; G01S 13/931; G01S 13/93; G01S 7/4026; G01S 2013/932; G01S 2013/93185; G01S 2007/4039; G01S 2007/403; G01S 2007/4034; B60R 21/013; B60R 2021/004
See application file for complete search history.

(56) References Cited

U.S. PATENT DOCUMENTS 6,414,623 B1    7/2002 Ashihara
2012/0253549 A1* 10/2012 Cund ................ G01S 13/584
701/1

(Continued)

FOREIGN PATENT DOCUMENTS

JP    2000321348 A    11/2000
JP    2002202361 A    7/2002
(Continued)

*Primary Examiner* — Aaron L Troost
(74) *Attorney, Agent, or Firm* — Hunton Andrews Kurth LLP

(57) ABSTRACT

A support determination unit prohibits a driving support ECU from performing a driving support control in the situation where an axis tilt error has not been not confirmed yet, when an axis tilt state detection unit detects an axis tilt state of a radar. The support determination unit cancels prohibiting the driving support ECU from performing the driving support control, when the radar axis tilt state has disappeared before a predetermined time period elapses, the predetermined time period being a time period within which a cause for a temporary axis tilt state is expected to be removed.

7 Claims, 12 Drawing Sheets

(51) Int. Cl.
*B60R 21/013* (2006.01)
*B60W 30/00* (2006.01)
*G01S 13/931* (2020.01)
*B60W 50/00* (2006.01)
*G01S 7/40* (2006.01)
*B60R 21/00* (2006.01)

(52) U.S. Cl.
CPC . *G01S 2007/4039* (2013.01); *G01S 2013/932* (2020.01); *G01S 2013/93185* (2020.01)

(56) References Cited

U.S. PATENT DOCUMENTS

2014/0333473 A1* 11/2014 Steinbuch ............. G01S 7/4026
342/174
2016/0207532 A1 7/2016 Kida

FOREIGN PATENT DOCUMENTS

| | | |
|---|---|---|
| JP | 2006047140 A | 2/2006 |
| JP | 2016210386 A | 12/2016 |

* cited by examiner

FIG. 6 (a)
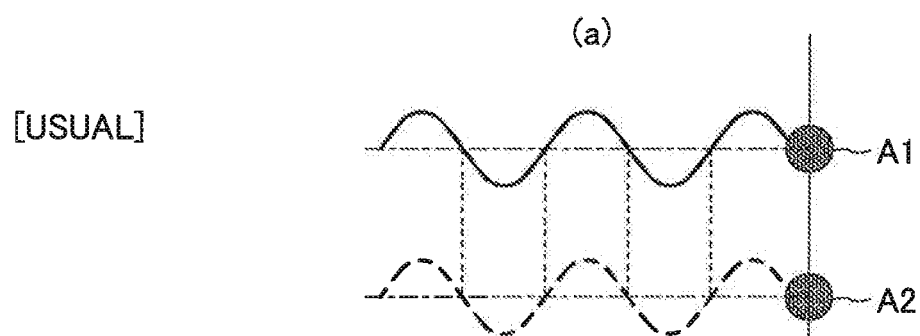
FIG. 6 (b)
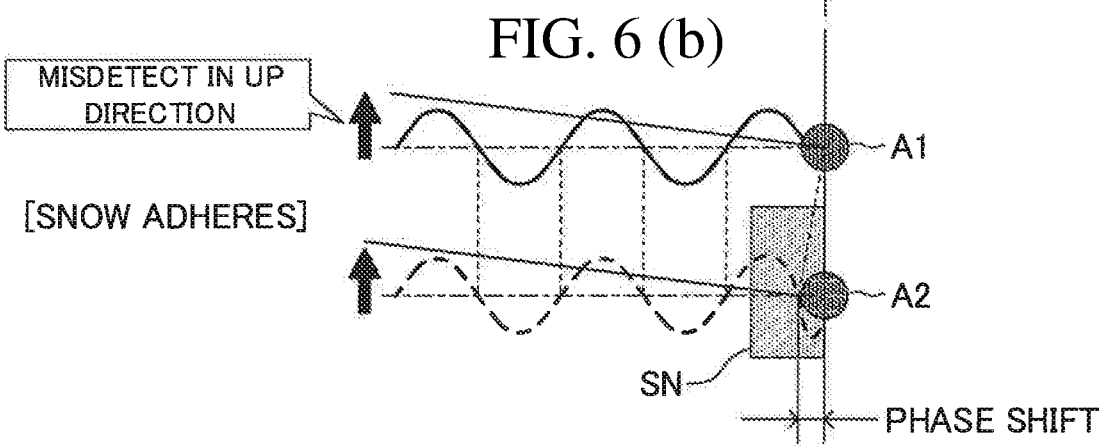
FIG.6

|  | PERFORMING ALLOWANCE | TEMPORARY PERFORMING PROHIBITION | AXIS TILT ERROR CONFIRMATION |
|---|---|---|---|
| MID | OFF | PRE-CRASH SAFETY IS UNAVAILABLE NOW. | PRE-CRASH SAFETY DOES NOT WORK. PLEASE INSPECT IT IN DEALER. |
| PCS INDICATOR | OFF | ON | FLASH |
| MASTER CAUTION | OFF | OFF | ON |
| BUZZER | OFF | OFF | ON |

FIG.10

DRIVING SUPPORT DEVICE AND CONTROL METHOD OF DRIVING SUPPORT DEVICE

CROSS-REFERENCE TO RELATED APPLICATION

The present application claims priority to Japanese Patent Application No. 2017-176160 filed on Sep. 13, 2017, which is incorporated herein by reference in its entirety.

BACKGROUND

Technical Field

The present disclosure relates to a driving support device for supporting driving of a driver based on detection information of a radar, and a control method of the driving support device.

Related Art

Hitherto, as proposed in Japanese Patent Application Laid-open No. 2016-210386, there has been known a driving support device configured to detect an obstacle which is present in an area around an own vehicle using a radar, and configured to perform a driving support control based on the detected information (detection information of the radar). For example, the driving support control is a control for decelerating the own vehicle in order to prevent the own vehicle from colliding with the obstacle.

The radar is fixed to a vehicle-body such that a radar reference axis of the radar is arranged at a predetermined location and in a predetermined direction. The radar reference axis is an axis which is a reference of a detection range of the radar. In general, the radar reference axis is referred to as an "optical axis" or a "beam axis". Hereinafter, the radar reference axis is referred to as a "radar axis".

Detection accuracy of the radar degrades in a state where the radar axis tilts with respect to the predetermined direction. Such a state is referred to as an "axis tilt state". Hitherto, as proposed in Japanese Patent Application Laid-open No. 2006-47140, there has been known an approach for detecting the axis tilt state of the radar.

When a conventional driving support device detects the axis tilt state of the radar, in other words, when an amount indicative of an extent of the axis tilt state (hereinafter, referred to as an "axis-tilt amount") is equal to or greater than a threshold, the conventional driving support device stores an axis tilt error code as a diagnosis error code and stops the driving support control.

The radar is arranged inside an outer plate (e.g., an bumper) of the vehicle. The radar emits/transmits radio waves to outside the vehicle via the outer plate. An object reflects the emitted/transmitted radio waves. The radar receives the reflected radar waves from the object via the outer plate to detect the object based on the reflected radio waves. When snow or rain droplet (hereinafter, referred to as "snow or the like") adheres to the outer plate, the axis tilt state may sometimes be detected regardless of whether or not a radar axis is in a proper direction. This is because "the snow or the like which is present in the path of the radio waves to/from the radar" changes wavelength of the radio waves. In this case, as described above, the driving support control may be stopped.

The axis tilt state caused by the snow or the like occurs temporarily. This axis tilt state disappears when the snow or the like is removed. However, even if the cause for the axis tilt state (i.e., snow, or the like, referred to as a temporary cause) is removed, the driving support device continues stopping the driving support control during a time period from "a time point at which the axis tilt error code was stored so that an axis tilt error was confirmed (i.e., the determination of an occurrence of the axis tilt state is finalized)" to "a time point at which a predetermined reset operation (for example, an operation of an ignition switch) is performed". Therefore, the driving support which the driver can receive is limited beyond necessity.

When the temporary axis tilt state occurs during a long drive, the driver cannot receive the driving support until the driver turns off the ignition switch. Meanwhile, in actuality, the axis tilt state may disappear before the driver turns off the ignition switch. In this case, the drive cannot receive the driving support for a long time even after the axis tilt state has already disappeared.

The present disclosure has been made to solve the problem described above. The present invention has an object to provide a driving support device that can prevent the driving control which the driver can receive from being limited beyond necessity.

A driving support device (1) according to the present disclosure comprises:

a radar (10) installed in a vehicle, for detecting an object in a predetermined area;

driving support control means (40) for performing a driving support control for supporting driving of a driver based on object information on the object detected by the radar;

detection means (32) for detecting an axis tilt state of the radar;

first prohibition means (S17) for prohibiting the driving support control means from performing the driving support control based on the object information without confirming an axis tilt error, at and after a time point at which the radar axis tilt state is detected by the detection means;

determination means (S13, S20) for determining whether or not the axis tilt state of the radar has disappeared before a predetermined time period elapses from the time point at which the radar axis tilt state is initially detected, the predetermined time period being a time period within which a cause for a temporary axis tilt state is expected to be removed; and cancel means (S14) for stopping prohibiting the driving support control, when the determination means determines that the radar axis tilt state has disappeared before the predetermined time period elapses (S13: Yes→No).

The driving support device according to the present disclosure comprises the radar and the driving support control means. The radar is installed in the vehicle, and detects the object which is present in the predetermined area. For example, the radar is attached/fixed to the vehicle at a position inside an outer plate (a bumper, an emblem plate which is attached on a front grill, or the like) of the vehicle. The radar transmits/emits a transmission signal to outside of the vehicle via a transmission antenna. The radar receives reflected waves of the transmission signal via a reception antenna to detect a relative location (a distance and direction) of the object in relation to the vehicle and a relative velocity of the object in relation to the vehicle based on the reflected waves. The driving support control means performs the driving support control for supporting the driving of the driver based on the object information on the object detected by the radar. The driving support control includes, for example, a pre-crash safety control for preventing the vehicle from colliding with an obstacle having a high probability of colliding with the vehicle when the obstacle is detected based on the object information on the object.

The radar detects the relative location of the object, the relative velocity of the object, and the like, on the premise that a radar axis is oriented in a proper direction. Accordingly, when the radar axis tilts with respect to the proper direction (the direction of the radar axis deviates from the proper/designed direction), accuracy in detecting the relative location, the relative velocity, or the like of the object degrades. Such degradation of the accuracy casts a bad influence on the driving support control. In view of this, the driving support device comprises the detection means. The detection means detects the axis tilt state of the radar. For example, the detection means detects the axis tilt state, in other words, determines that the axis tilt state occurs, when an axis tilt amount is outside (does not fall within) a permissible range.

In general, the radar is attached/fixed to the position inside of (or backside of) the outer plate of the vehicle. In this case, the radar transmits the transmission signal via the outer plate, and receives the reception signal via the outer plate. Therefore, when snow, rain droplets, or the like adheres to the outer plate, the axis tilt state may be detected, even if the radar axis is oriented in the proper direction. When the radar has a protection cover in/from a direction where the radar transmits/receives the signals, the axis tilt state due to the snow, rain droplets, or the like adhered to the cover may be detected even if the radar axis is oriented in the proper direction.

In view of the above, the driving support device according to the present disclosure comprises the first prohibition means, the determination means, and the cancel means. The first prohibition means prohibits the driving support control means from performing the driving support control based on the object information without confirming an axis tilt error (i.e., in a situation where an axis tilt error has not been not determined yet), at and after a time point at which the radar axis tilt state is detected by the detection means. Therefore, the driving support control having a low accuracy/reliability due to the axis tilt state is prohibit. For example, if the driving support device is configured to store a diagnosis axis tilt error code so as to confirm the axis tilt error (i.e., occurrence of an error of the axis tilt), in other words, if the driving support device is configured to store the diagnosis axis tilt error code when the axis tilt error is confirmed, the driving support control is prohibited from being performed while the axis tilt error code is not stored.

The determination means determines whether or not the axis tilt state of the radar has disappeared before the predetermined time period elapses from the time point at which the radar axis tilt state is initially detected. For example, in a case where the temporary axis tilt state due to the snow or the like adhered to the outer plate has been detected, the axis tilt state becomes undetected when the cause (i.e., snow or the like adhered to the outer plate) for the axis tilt state is removed (or disappears). The predetermined time period is a time period within which the "cause for such a temporary axis tilt state" is expected to be completely removed (disappear).

The cancel means stops prohibiting the driving support control, when the determination means determines that the radar axis tilt state has disappeared before the predetermined time period elapses. According to the present disclosure, even if the axis tilt state occurs due to the cause for such a temporary axis tilt state, the driver can receive the driving support when and after that cause disappears/or is removed.

As a result, the driving support device can avoid the driving support control which the driver can receive from being limited beyond necessity.

One embodiment of the present disclosure resides in that the driving support device further comprises first informing means (S35, S60, S61) for informing that the driving support control is unavailable without informing that an inspection is necessary, when the first prohibition means prohibits the driving support control means from performing the driving support control based on the object information without confirming the axis tilt error.

According to the embodiment of the present disclosure, the first informing means informs that the driving support control is unavailable without informing that the inspection is necessary, when the first prohibition means prohibits the driving support control means from performing the driving support control based on the object information in a period in which the axis tilt error is not confirmed. Therefore, the driver is notified that the driver cannot receive the driving support. At this time, the driver is not informed of the inspection necessity. Therefore, the driving support device does not urge the driver to have the vehicle inspected, more than necessary. This can prevent a situation where such message annoys the driver from occurring.

One embodiment of the present disclosure resides in that the driving support device further comprises second prohibition means (S27: Yes, S28, S11: Yes, S30) for confirming the axis tilt error and for prohibiting the driving support control means from performing the driving support control until a predetermined reset operation is detected, when the determination means determines that the radar axis tilt state has not disappeared before the predetermined elapses.

When the axis tilt state occurs due to a cause different from the temporary cause, the axis tilt state does not disappear. In this case, the second prohibition means works/functions instead of the first prohibition means. The second prohibition means confirms (i.e., finalizes the determination of) the axis tilt error and prohibits the driving support control means from performing the driving support control until a predetermined reset operation is performed, when the determination means determines that the radar axis tilt state has not disappeared (i.e., the radar axis tilt state still continues) at the time point at which the predetermined has elapsed. For example, the predetermined reset operation includes an operation of/on the ignition operation.

Therefore, the driving support device can certainly prevent the driving support control having the low accuracy/reliability due to the axis tilt state from being performed.

One embodiment of the present disclosure resides in that the driving support device further comprises second informing means (S37, 60, 61) for informing that the driving support control is unavailable and an inspection is necessary, when the second prohibition means prohibits the driving support control means from performing the driving support control while the radar axis tilt error is confirmed.

According to the embodiment, the second informing means informs that the driving support control is unavailable with informing that the vehicle inspection is necessary, when the second prohibition means prohibits the driving support control means from performing the driving support control while the radar axis tilt error is confirmed. Therefore, the driver can recognize that the driver cannot receive the driving support. At this time, the driver can recognize that the vehicle is required to be inspected. Therefore, the driver can be urged at an appropriate timing to have the vehicle inspected.

One embodiment of the present disclosure resides in that the determination means is configured to determine whether or not the predetermined time period has elapsed using a continuation time period during which the radar axis tilt state continues being detected (S22, S23).

When the axis tilt state due to the temporary cause is detected, the temporary cause for the axis tilt state is expected to disappear as time passes. Therefore, the driving support device can determine whether or not the predetermined time period elapses based on (using) the axis tilt continuation time period. Accordingly, the driving support device can perform the above-described determination easily. The continuation time period in which the axis tilt state continues being detected is the continuation time period in which the axis tilt continues being detected in a situation where the axis tilt state can be detected (in the situation where it can be determined whether or not the axis tilt occurs).

One embodiment of the present disclosure resides in that the determination means is configured to determine whether or not the predetermined time period has elapsed using the number of trips after the axis tilt is initially detected, each of the trips being one period for which an ignition switch continues being in an on state (S24 through S27).

In the case where the axis tilt state due to the temporary cause is detected, the temporary cause is expected to disappear (or is removed) as the number of the trips increases (to a certain number) after the axis tilt state was initially detected. Therefore, the driving support device can determine whether or not the predetermined time period has elapsed based on (using) the number of the trips after the axis tilt of the radar was initially detected. Accordingly, the driving support device can perform the above-described determination readily.

One embodiment of the present disclosure resides in that the determination means comprises:

count time period means (S22) for counting an axis tilt continuation time period which is a period for which the radar axis tilt state continues being detected;

continuation determination means (S23) for determining whether or not a continuation condition is established, the continuation condition being a condition satisfied when the axis tilt continuation time period is equal to or longer than a predetermined time period in one trip being one period for which an ignition switch continues being in an on state;

count means (S25) for counting the number of the trips in each of which the continuation condition is established; and time period elapsing determination means (S27) for determining that the predetermined time period has elapsed while the axis tilt state does not disappear, when the number of the trips reaches a predetermined number.

According to the embodiment, the determination means comprises the count time period means, the continuation determination means, the count means, and the time period elapsing determination means. The count time period means counts the axis tilt continuation time period which is a period for which the radar axis tilt state continues being detected. For example, the count time period means counts the continuation time period for which the radar axis tilt state continues being detected in/under a predetermined situation (e.g., in/under a situation where the vehicle travels at a velocity equal to or higher than a predetermined velocity).

The continuation determination means determines whether or not a continuation condition is established. The continuation condition being a condition satisfied when the axis tilt continuation time period is equal to or longer than a predetermined time period in one trip which is one continuous period for which an ignition switch of the vehicle continues being in an on state. As the axis time continuation period is longer, detection accuracy/reliability of the axis tilt state (accuracy/reliability of determination that the axis tilt state occurs) is higher. Therefore, the predetermined time period is set to a time period which can secure the detection accuracy/reliability of the axis tilt state so that the continuation determination means can perform the detection of the axis tilt with a high accuracy/reliability.

The count means counts the number of the trips in each of which the continuation condition is established. For example, when the snow adheres to the vehicle, the driver may remove the snow. In general, the driver removes the snow while the ignition switch is in the off state. The snow or the like which adheres to the own vehicle may disappear (or is removed) owing to weather change while the vehicle continues being parked. Therefore, in the case where the axis tilt state due to the adherent of the snow or the like has been detected, the axis tilt state disappears (or is removed) when the number of the trips reaches a predetermined number after the axis tilt state has been initially detected. In view of this, the time period elapsing determination means that the predetermined time period has elapsed while the axis tilt state does not disappear, when the number of the trips reaches the predetermined number. The predetermined number may preferably be set/predetermined based on "the number of the trips" within which the cause for the temporary axis tilt state is expected to disappear (or be removed).

According to the embodiment, a timing at which the axis tilt error is confirmed can be set appropriately. Further, safety and usability of the driving support device can be further improved.

The present disclosure can be applied to not only the driving support device but also a control method of the driving support device The control method of the driving support device includes:

a detection step (S13) for determining whether or not an axis tilt state of a radar which is installed in a vehicle and which is able to detect an object in a predetermined area occurs;

a prohibition step (S17) for prohibiting the driving support device from performing a driving support control for supporting driving of a driver of the vehicle based on object information at and after a time point at which the axis tilt is initially detected in the detection step without confirming an axis tilt error;

a determination step (S13, S20) for determining whether or not the axis tilt state has disappeared before a predetermined time period elapses from the time point at which the axis tilt is initially detected; and a cancel step (S14) for stopping prohibiting the driving support device from performing the driving support control, when it is determined that the axis tilt state has disappeared before the predetermined time period elapses in the determination step.

According to the control method of the driving support device of the present disclosure, in the case where the axis tilt occurs due to the temporary cause, the driver can receive the driving support when the temporary cause disappears or is removed. As a result, the method can prevent the driving support control which the driver can receive from being limited more than necessary.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols.

BRIEF DESCRIPTION OF THE DRAWINGS

FIG. 6 is a diagram illustrating a principle of misdetecting a location of an object in an up-down direction due to adherent of snow.

FIG. 10 is a diagram illustrating contents displayed on a display unit.

FIG. 11 is timing charts illustrating change of an axis trip count value C, a timing at which an axis tilt error code is stored, and the like.

FIG. 12 is timing charts illustrating the change of the axis trip count value C, the timing at which the axis tilt error code is stored, and the like.

DETAIL DESCRIPTION

"A driving support device and a driving support control method performed by the driving support device" according to an embodiment of the present disclosure will next be described with reference to the accompanying drawings.

Figure 1:
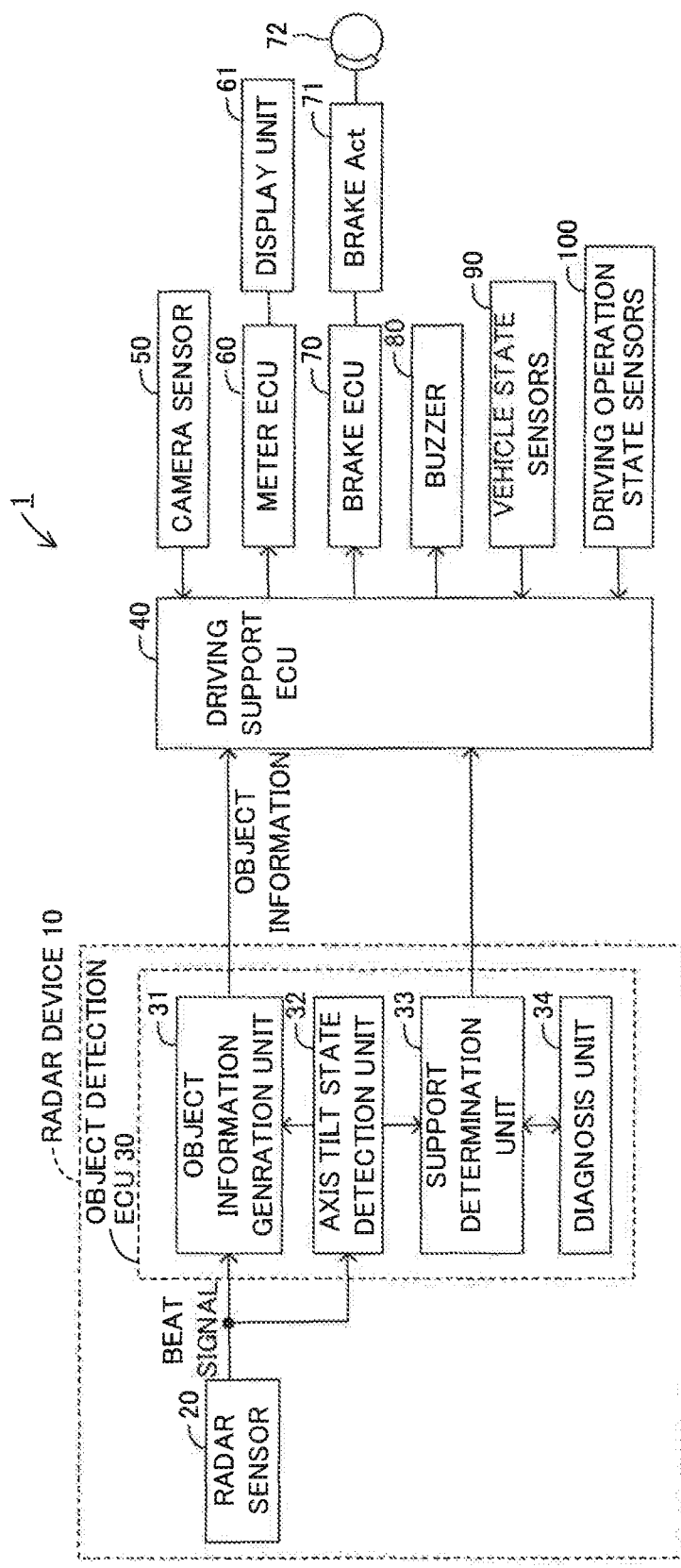
FIG. 1 is a schematic system configuration diagram of a driving support device according to an embodiment.

A schematic configuration of a driving support device 1 according to the embodiment of the present disclosure is shown in FIG. 1. The driving support device 1 is installed in a vehicle. Hereinafter, this vehicle may be referred to as an "own vehicle", when this vehicle needs to be distinguished from other vehicles.

The driving support device 1 comprises a radar device 10, a driving support ECU 40, a camera sensor 50, a meter ECU 60, a brake ECU 70, a buzzer 80, vehicle state sensors 90, and driving operation state sensors 100.

Each ECU is an "Electronic Control Unit" which includes a microcomputer as a main part. The microcomputer includes a CPU, a ROM, a RAM, a no-volatile memory, an interface I/F, and the like. The CPU achieves various functions by executing instructions (program, routine) stored in the ROM. Some or all of these ECUs may be integrated into a single ECU.

The radar device 10 includes a radar sensor 20 and an object detection ECU 30. The radar sensor 20 is fixed to the center in a vehicle width direction in a front end of a vehicle body. In this embodiment, the radar device 10 is fixed to a vehicle body member which is arranged on the backside of an emblem plate. The emblem plate is arranged at the center of a front grill. In some embodiments, the radar device 10 is fixed to vehicle body member at a position covered by a front bumper. Hereinafter, a plate (the emblem plate, the front bumper, or the like) in front of the radar device 10 is simply referred to as an "outer plate", for convenience.

Figure 2:
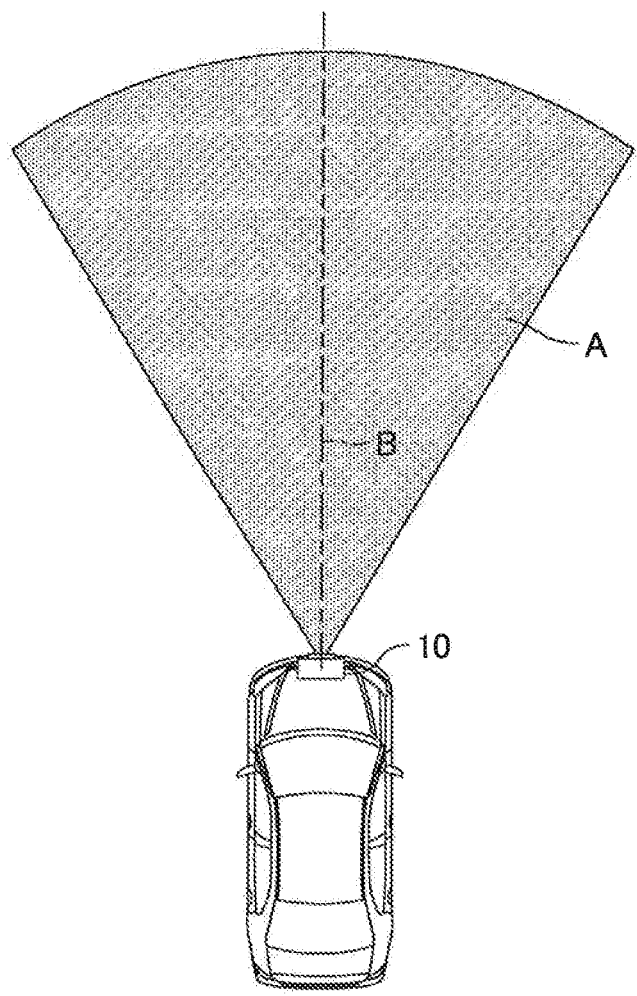
FIG. 2 is a plane diagram illustrating a reference axis of a radar and a detection range of the radar.
Figure 3:
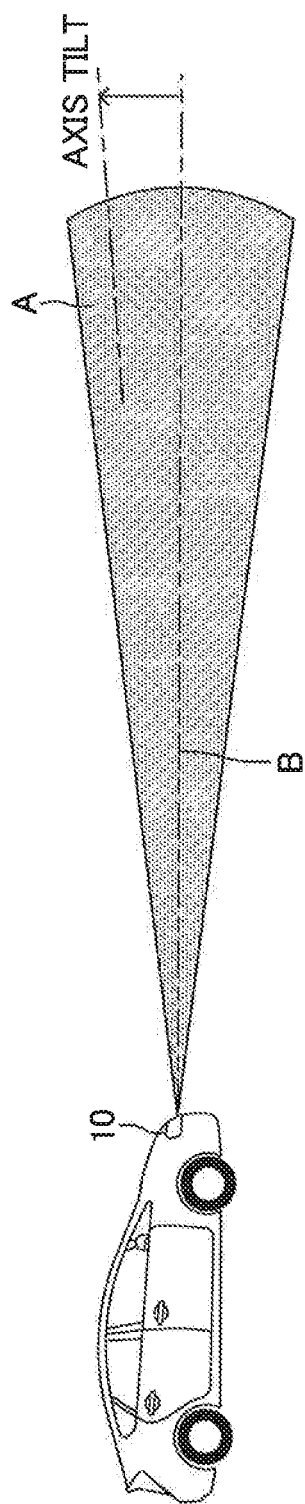
FIG. 3 is a side-view diagram illustrating the reference axis of the radar and the detection range of the radar.

As shown in FIGS. 2 and 3, the radar sensor 20 emits/transmits radio waves to a predetermined detection area A, and receives reflected radio waves of the emitted/transmitted radio waves to detect an object which is present in the detection area A. This detection area A is a space which has a predetermined angle in a left-right direction with respect to a radar axis B and a predetermined angle in an up-down direction with respect to the radar axis B. Although a detection angle range of the radar sensor 20 is shown in FIGS. 2 and 3, a detection distance of the radar sensor 20 is for illustrative purposes only (i.e., not exactly shown) in FIGS. 2 and 3. The detection distance of the radar sensor 20 is set to an appropriate value in accordance with a purpose of the radar sensor 20. In some embodiments, the detection distance of the radar sensor 20 is set to "tens of meters".

The radar sensor 10 is a millimeter wave radar of a pulse compression type. The radar sensor 10 detects a relative location (a relative distance and a relative angle) of the object in relation to the radar sensor 20, a relative velocity of the object in relation to the radar sensor 20, and the like. The pulse compression type is also referred to as a Fast Chirp Modulation (FCM) type.

The radar sensor 10 is not limited to the FCM type radar device. In some embodiments, the radar sensor 10 may be other type radar device. For example, the radar sensor 10 is a millimeter wave radar of a Frequency Modulated-Continuous Wave (FM-CW) type.

Figure 4:
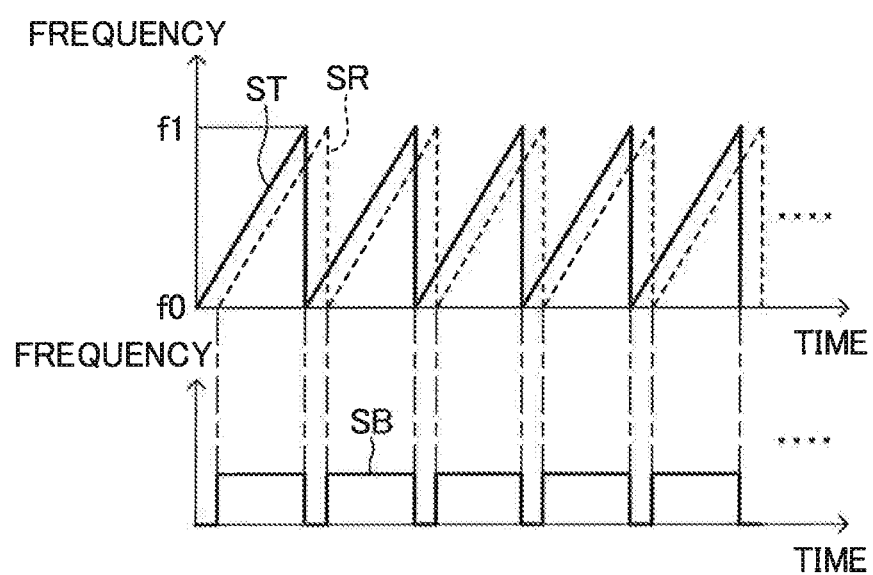
FIG. 4 is graphs illustrating a transmission signal ST, a reception signal SR, and a beat signal SB.

The radar sensor 20 includes a transmitter (not shown), a receiver (not shown), and a signal processing unit (not shown). The transmitter performs frequency modulation of a "reference signal" which has a predetermined frequency, so as to generate a signal having a frequency changing with time. The generated signal is referred to as a "transmission signal". The transmitter transmits the generated transmission signal from a transmission antenna to the detection area. As shown in FIG. 4, the radar sensor 10 transmits the transmission signal ST whose one chirp (one signal waveform) has a saw tooth form. More specifically, a frequency of the transmission signal increases from a reference frequency f0 until a maximum frequency f1 as time passes. When the frequency reaches the maximum frequency f1, the frequency returns to the reference frequency f0 almost vertically. The receiver is an electronic circuit which receives, as a reception signal, "a signal propagating in the detection area" via a reception antenna. When the object is present in the detection area, the object reflects the transmission signal ST. The receiver receives, as the reception signal, the reflected signal (waves). The signal processing unit mixes the transmission signal ST generated by the transmitter with the reception signal SR which is received by the receiver. The signal processing unit calculates a difference between the frequency of the transmission signal ST and the frequency of the reception signal SR so as to generate a beat signal SB shown in FIG. 4.

A reception antenna unit includes a plurality of reception antennas. A plurality of the reception antennas are arranged to be separated from each other at a predetermined distance in the left-right direction and at a predetermined distance in the up-down direction. The beat signal is generated for each of channels (the reception antennas). The radar sensor 20 transmits the generated beat signal to the object detection ECU 30.

The transmission signal (radio waves) which is transmitted by the transmitter and the reception signal (reflected waves) which is received by the receiver pass through the outer plate arranged in front of the radar sensor 10.

As shown in FIG. 1, the object detection ECU 30 includes an object information generation unit 31, an axis tilt state detection unit 32, a support determination unit 33, and a diagnosis unit 34, in terms of functions of the object detection ECU 30. The object information generation unit 31 performs a frequency analysis (e.g., a Fourier transformation) of the beat signal transmitted by the radar sensor 20 so as to calculate "the distance between the radar sensor 20 and the object" based on a delay time from a time point at which a transmission wave (signal) is transmitted until a time point at which a reception wave (signal) is received. The object information generation unit 31 calculates the relative velocity of the object in relation to the radar sensor 20 based on the difference between the frequency of the transmission wave and the frequency of the reception wave. Further, the object information generation unit 31 calculates the directions (a direction in a horizontal direction (plane) and a direction in a vertical direction (plane)) of the object in relation to the radar sensor 20 based on a signal phase difference among the channels. Hereinafter, information on the object, in other words, information indicative of the relative location (the relative distance and the relative direction) of the object in relation to the radar sensor 20 and the relative velocity of the object in relation to the radar sensor 20 is referred to as "object information". The object may be referred to as a "target object". The object information generation unit 31 transmits the object information (which is the calculation result) to the driving support ECU 40.

The axis tilt state detection unit 32 functions to detect an axis tilt state of the radar axis of the radar sensor 20. The radar device 10 generates the object information on the premise that the radar axis is fixed such that the direction of the radar axis is proper. Therefore, when the radar axis tilts from a proper (or designed) direction, in other words, when the axis tilt state occurs, detection accuracy of the radar device 10 degrades/decreases.

The axis tilt state detection unit 32 learns an average location in the up-down direction of the object detected by the radar sensor 20 in order to detect the axis tilt state in the up-down direction of the radar axis. The axis tilt state detection unit 32 preforms this learning process when an axis tilt state detection condition is established. The axis tilt state detection condition is established when a vehicle velocity is equal to or higher than a predetermined velocity. For example, in the learning process, the axis tilt state detection unit 32 obtains the average location to be learned through calculating a weight-average of an average location which has already been learned before the present time point and an average location at the present time point using a predetermined weight (distribution). The axis tilt state detection unit 32 stores, as a reference value, an average location in the up-down direction of the object which has been obtained through the learning process for a time period between a time point of shipping from a factory and a time point at which a predetermined time period elapses from the time point of shipping from the factory. When the radar axis tilts in an up direction or in a down direction, the average location of the object in the up-down direction changes. The axis tilt state detection unit 32 calculates an axis tilt amount θ indicative of a relative angle in relation to the reference value based on the learned average location of the object in the up-down direction. That is, the learning of the average location has the substantially same meaning as learning of the axis tilt amount θ.

The axis tilt amount θ is "0 deg" when the average location of the object in the up-down direction is equal to the reference value. The magnitude of the axis tilt amount θ becomes greater as a magnitude of the difference between the axis tilt amount θ and the reference value is greater.

The axis tilt state detection unit 32 outputs information indicative of the learned axis tilt amount θ to the object information generation unit 31. The object information generation unit 31 amends/modifies the location information on the target object detected by the above described radar sensor 20 to generate final object information on the target object, and transmits the final object information to the driving support ECU 40.

The axis tilt state detection unit 32 determines that the axis tilt state occurs when the axis tilt amount θ falls outside a permissible range (|θ|>θref). Hereinafter, "determining that the axis tilt state occurs" may be expresses as "detecting the axis tilt state".

The axis tilt state detection unit 32 transmits a "determination result indicative of whether or not the axis tilt state has occurred" to the support determination unit 33. The transmitted determination result is referred to as "axis tilt state determination information".

The support determination unit 33 receives the axis tilt state determination information. The support determination unit 33 determines whether to permit the driving support ECU 40 to perform the driving support control based on the received axis tilt state determination information. In other words, the support determination unit 33 determines whether to prohibit the driving support ECU 40 from performing the driving support control based on the received axis tilt state determination information. That is, the support determination unit 33 determines whether or not the driving support ECU 40 is allowed to perform the driving support control based on the axis tilt state determination information. Furthermore, the support determination unit 33 determines whether or not the axis tilt error occurs based on the axis tilt state determination information. The support determination unit 33 transmits, to the driving support ECU 40, information (performing propriety information, or performing permission/prohibition information) indicative of whether or not the driving support control is allowed, and information (axis tilt error determination information) indicative of whether or not the axis tilt error occurs. These processes performed by the support determination unit 33 will be described later in more detail.

The diagnosis unit 34 functions to store and hold "error codes of diagnosis" indicative of various errors which occur in the radar device 10. Each of the error codes indicates a content of the error. The support determination unit 33 stores "one of the error codes (an axis tilt error code) representing that the axis tilt error has occurred" in non-volatile memory included in the diagnosis unit 34, when it is determined/confirmed that the axis tilt error has occurred. The diagnosis unit 34 holds (continue storing) the axis tilt error code until the support determination 33 deletes/erases the stored axis tilt error code.

The support determination unit 33 always keeps the axis tilt state determination information at the present time point. When the ignition switch is turned off, the support determination unit 33 stores and holds the axis tilt state determination information kept at a time point immediately before the ignition switch is turned off. Thereafter, when the ignition switch is turned on, the support determination unit 33 reads out the axis tilt determination which has been stored/held. When that axis tilt state determination information indicates that the axis tilt error has not occurred (for example, when the axis tilt disappeared while the ignition switch was previously in an on-state), the support determination unit 33 deletes/erases the axis tilt error code which has been stored in the diagnosis unit 34. On the other hand, when the axis tilt state determination information indicates that the axis tilt error has occurred (for example, when the axis tilt did not disappear while the ignition switch was previously in the on-state), the support determination unit 33 does not delete/erase the axis tilt error code which has been stored in the diagnosis unit 34. In this case, the axis tilt error code continues being stored/held in the diagnosis unit 34.

In some embodiments, the support determination unit 33 deletes/erases the axis tilt error code when the ignition switch is turned off before the ignition switch is again turned on. That is, when it is determined that the axis tilt has disappeared based on the axis tilt state determination information at the time point at which the ignition switch is turned off, the axis tilt error code which has been stored in the diagnosis unit 34 is deleted/erased. In contrast, when it is determined that the axis tilt has not disappeared based on the axis tilt state determination information at the time point at which the ignition switch is turned off, the axis tilt error code is left stored (continues to be held) as it is.

Therefore, the axis tilt error code is reset (deleted) at a time point at which the ignition switch is operated (i.e., a time point at which a state of the ignition switch is changed from an off-state to the on-state or from the on-state to the off-state), only in a case where the axis tilt has disappeared by that time point.

The driving support ECU 40 performs the driving support control for supporting a driving operation of the driver. The driving support ECU 40 performs a pre-crash safety control as the driving support control. Hereinafter, the pre-crash safety control is referred to as a PCS control.

The driving support ECU 40 is connected to the camera sensor 50, the meter ECU 60, the brake ECU 70, the buzzer 80, the vehicle state sensors 90, and the driving operation state sensors 100 in order to perform various driving support controls including the PCS control.

The camera sensor 50 includes a camera (not shown) and an image processing unit (not shown). The camera photographs a front area of the own vehicle to acquire image data. The image processing unit detects the obstacle (for example, a vehicle or a pedestrian) which is present in the front area of the own vehicle based on the image data acquired by the camera, to transmit camera detection information on the detected obstacle to the driving support ECU 40. The camera detection information includes presence/absence information indicative of whether or not the obstacle is present, location information of the obstacle, size information of the obstacle, and the like.

The meter ECU 60 is connected to the display unit 61. The display unit 61 is arranged at a position in front of a driver's seat. The display unit 61 includes a multi-information display (referred to as a "MID") (not shown), a master caution lump (not shown), and a PCS indicator (not shown). The MID informs the driver of various information, using characters and the like. The meter ECU 60 controls display of the display unit 61 based on a display instruction transmitted from the driving support ECU 40.

The brake ECU 70 is connected to a brake actuator 71. The brake actuator 71 is provided in a hydraulic circuit between an "unillustrated master cylinder which pressurizes working oil by using a depressing force applied to a brake pedal" and friction brake mechanisms 72. The friction brake mechanisms 72 are provided in a left front wheel, a right front wheel, a left rear wheel, and a right rear wheel. Each of the friction brake mechanisms 72 includes a "brake disc which is fixed to the corresponding one wheel" and a "brake caliper which is fixed to the corresponding one wheel". The brake actuator 71 adjusts oil pressure applied to a wheel cylinder installed in the brake caliper based on an instruction transmitted from the brake ECU 70. The oil pressure makes the wheel cylinder work so as to press a brake pad to the brake disc. As a result, frictional braking force is generated. Therefore, the brake ECU 70 controls the brake actuator 71 so as to control a braking force of the own vehicle.

For example, when the brake ECU 70 receives a pressure assistance instruction transmitted from the driving support ECU 40, the brake ECU 70 controls the brake actuator 71 so as to generate frictional braking force greater than frictional braking force which is generated when the braked pedal is operated normally. That is, the brake ECU 70 makes a "ratio of the frictional braking force to a depressing stroke of the brake pedal when the brake ECU 70 receives the pressure assistance instruction" greater than the "ratio when the brakes ECU 70 receives no pressure assistance instruction (at normal time)". Besides, when the brake ECU 70 receives an automatic braking instruction transmitted from the driving support ECU 40, the brake ECU 70 controls the brake actuator 71 to generate predetermined frictional force without a brake pedal operation.

The buzzer 80 works in response to a working instruction transmitted from the driving support ECU 40 to output buzzer sound which is specified by the working instruction. This buzzer sound alerts the driver.

The vehicle state sensors 90 include various types of sensors for detecting vehicle state. For example, the vehicle state sensors 90 include a vehicle velocity sensor for detecting a traveling velocity (speed) of the vehicle, wheel velocity sensors for detecting a wheel velocity, a front-rear G sensor for detecting an acceleration in the front-rear direction of the vehicle, a left-right G sensor for detecting an acceleration in the left-right direction of the own vehicle, and a yaw rate sensor for detecting a yaw rate of the vehicle.

The driving operation state sensors 100 include various types of sensors for detecting a driving operation state of the driver. The driving operation state sensors 100 include an accelerator operation amount sensor for detecting an operation amount of an accelerator pedal, a brake operation amount sensor for detecting an operation amount of the brake pedal, a brake switch for detecting whether or not the brake pedal is operated, a steering angle sensor for detecting a steering angle, a turn signal operation sensor for detecting an operation of a turn signal lever, and a shift position sensor for detecting a shift position of a transmission.

Sensor information acquired by the vehicle state sensors 90 and the driving operation state sensor 100 are supplied to the radar device 10, as needed.

The PCS control which is included in the driving support control performed by the driving support ECU 40 will be described. The PCS control is described briefly, because the PCS control is a well-known approach. The driving support ECU 40 specifies an obstacle which is present in a front area of the own vehicle based on the object information transmitted from the radar device 10 and the camera detection information transmitted from the camera sensor 50, and calculates a probability that the own vehicle collides with the obstacle. For example, the driving support ECU 40 calculates time to collision TTC(=Dr/Vr) which is time between the present time point and a time point at which the own vehicle will collide with the obstacle, based on a "relative distance Dr between the own vehicle and the obstacle which is present in the front area of the own vehicle", and a relative velocity Vr of the obstacle with respect to the own vehicle. This time to collision TTC is used as an index value indicative of the probability that the own vehicle collides with the obstacle. As the time to collision TTC is shorter, the probability is higher (an urgency degree is higher).

When the time to collision TTC is shorter than an alert level, the driving support ECU 40 makes the buzzer intermittently work with displaying a message "brake!" on the MID so as to alert the driver. In addition, in this case, the driving support ECU 40 transmits the pressure assistance instruction to the brake ECU 70 so as to increase brake oil pressure. This increase of the brake oil pressure improves braking effect/efficiency when the brake pedal is depressed. When the time to collision TTC becomes shorter than an automatic brake level, the driving support ECU 40 transmits the automatic brake instruction to the brake ECU 70 so as to generate the predetermined frictional braking force regardless of whether or not the driver performs the brake operation.

The PCS control described above can prevent the collision or decrease collision damage which is generated when the own vehicle collides with the obstacle.

In some embodiments, the driving support ECU 40 performs another driving support control in addition to the PCS control. In some embodiments, the driving support ECU 40 performs another driving support control instead of the PCS control. For example, the driving support ECU 40 performs a inter-vehicle distance maintenance traveling support control (an adaptive cruise control) for making the own vehicle follow a preceding vehicle with keeping a predetermined inter-vehicle distance between the own vehicle and the preceding vehicle. When the driving support ECU 40 performs the inter-vehicle distance maintenance traveling support control, the driving support ECU 40 calculates a inter-vehicle distance between the own vehicle and the preceding vehicle based on the object information transmitted from the radar device 10, and calculates a target acceleration for maintaining the inter-vehicle distance at a predetermined target distance. The driving support ECU 40 transmits an acceleration instruction indicative of the target acceleration to an engine ECU (not shown). In response to the acceleration instruction indicative, the driving support ECU 40 controls the engine of the own vehicle so as to make the own vehicle follow the preceding vehicle with keeping an appropriate inter-vehicle distance.

The driving support ECU 40 performs the PCS control based on the object information transmitted from the object detection ECU 30 included in the radar device 10. Only when the performing propriety information transmitted from the support determination unit 33 included in the object detection ECU 30 represents that the driving support control is allowed/permitted to be performed, in other words, only when the driving support ECU 40 has received a performing allowance instruction, the driving support ECU 40 is allowed/permitted to perform the driving support control including the PCS control.

Processes executed by the support determination unit 33 included in the object detection ECU 30 will next be described. First of all, a phenomenon that the temporary axis tilt state occurs will be described.

Figure 5:
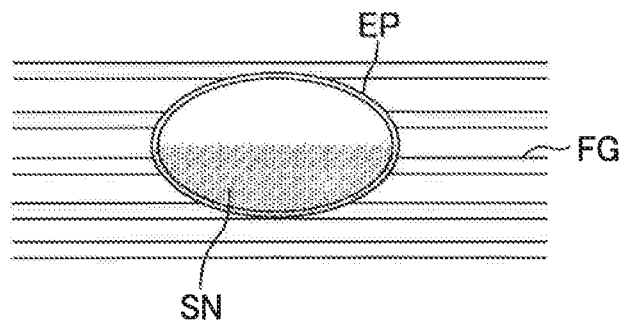
FIG. 5 is a diagram illustrating a situation where snow adheres to an emblem plate.

Even if the direction of the radar sensor 10 which has been fixed to the vehicle body member is within an appropriate range, it may be determined that the axis tilt state has occurred, when the snow or the like adheres to the outer plate which is arranged in front of (or, covers) the radar device 10. For example, as shown in FIG. 5, snow SN sometimes adheres to a lower part of the emblem plate EP attached in the front grill FG. The radar sensor 20 is fixed to the vehicle body member which is arranged on the backside of the emblem plate EP. As shown in (a) of FIG. 6, when no snow adheres to the emblem plate EP, a phase of the reflected waves which an upper reception antenna A1 receives is the same as a phase of the reflected waves which a lower reception antenna A2 receives, the reflect waves being waves reflected by the object which is present in right (immediately) front of the radar sensor 20.

On the other hand, as shown in (b) of FIG. 6, when the snow SN is present in right front of the lower reception antenna A2, the wavelength of the "reflected waves which the lower reception antenna A2 receives" changes/alters, because that reflected waves pass through the snow SN having a dielectric constant different from that of the air. As a result, the phase of the reflected waves which the upper reception antenna A1 receives is different from the phase of the reflected waves which the lower reception antenna A2 receives. The "phase difference between the phase of the reflected waves which the upper reception antenna A1 receives and the phase of the reflected wave which the lower reception antenna A2 receives" normally indicates/represents a distance difference between "a distance from the upper reception antenna A1 to the object" and "a distance from the lower reception antenna A2 to the object". Thus, the phase difference is used to calculate the direction of the object in the up-down direction. As a result, in the example shown in (b) of FIG. 6, a detected location of the object in the up-down direction is higher (more upward) than an actual/true location of the object in the up-down direction.

In this case, there is a risk that the axis tilt state detection unit 32 of the conventional device performs an incorrect axis tilt amendment/modification.

When the axis tilt state is detected, the conventional device stores the axis tilt error code of the diagnosis so as to stop/cancel the driving support control using the radar sensor 10, in other words, the conventional device prohibits itself from performing the driving support control using the radar sensor 10. When the cause of the axis tilt state (the adherent of the snow or the rain droplet) is removed after the axis tilt state has been detected due to the adherent of the snow or the droplet, the driving support control no longer has to be prohibited. However, the conventional device stores the axis tilt error code so that the axis tilt error is confirmed when axis tilt state is detected, and thus, the conventional device continues prohibiting the driving support control unless the own vehicle is restarted through the operation of the ignition switch. Therefore, the driving control which the driver can receive is limited beyond necessity.

When the axis tilt error is confirmed, the conventional device informs the driver of the inspection necessity. When the axis tilt state due to the temporary cause (such as the snow or the rain droplet) is detected, that is, when the axis tilt state which can disappear as time goes by is detected, informing the driver of the inspection necessity is inappropriate.

Figure 7:
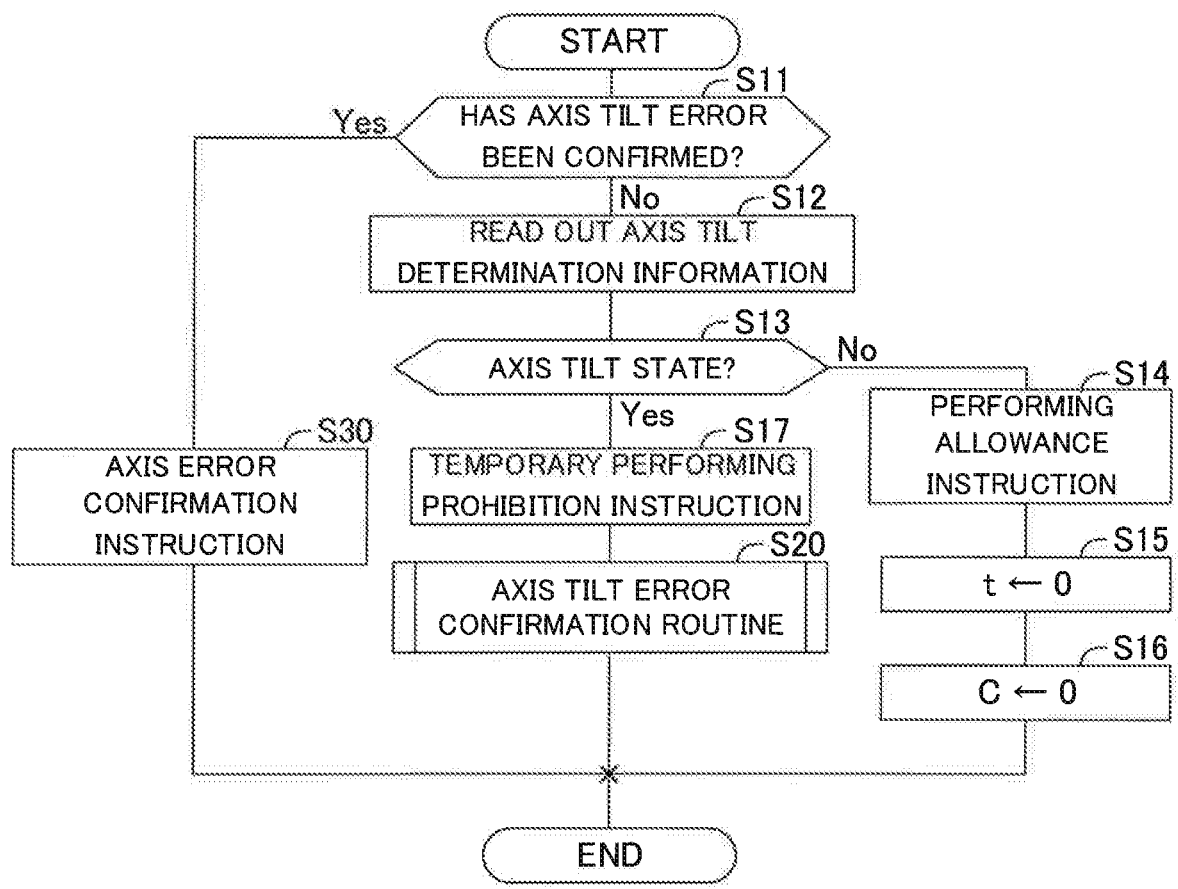
FIG. 7 is a flowchart illustrating a driving support determination routine.
Figure 8:
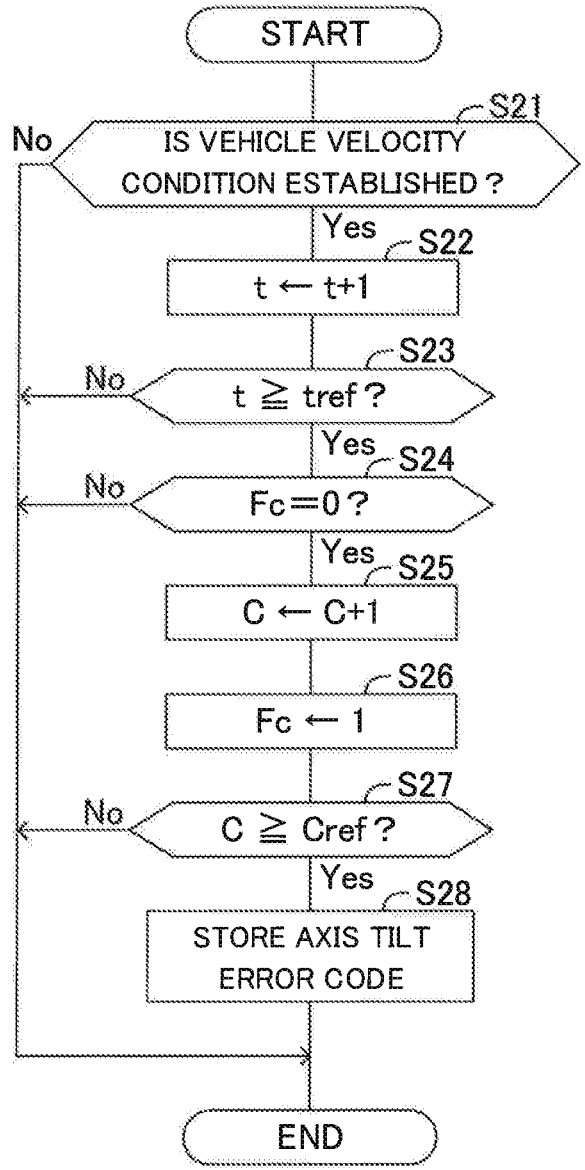
FIG. 8 is a flowchart illustrating an axis tilt error confirmation routine.

In view of the above, the support determination unit 33 limits "the driving support control which is performed by the driving support ECU 40" appropriately in order to solve the above described problem. A driving support control determination routine which is executed by the object detection ECU 30 is shown in FIG. 7. An axis tilt error confirmation routine (subroutine) which is embedded/included in the driving support control is shown in FIG. 8. The support determination unit 33 repeatedly executes the driving support determination routine, every time a predetermined elapses, while the ignition switch is in the on-state.

When the driving support determination routine starts, the support determination unit 33 determines whether or not the axis tilt error has already been confirmed at Step S11. The axis tilt error is confirmed through the axis tilt error confirmation routine (S20). When the axis tilt error is confirmed, the axis tilt error code is stored in the diagnosis unit 34. Therefore, at Step S11, the support determination unit 33 determines whether or not the axis tilt error code has been stored in the diagnosis unit 34.

When the axis tilt error has not been confirmed yet, the support determination unit 33 reads out the axis tilt state determination information transmitted from the axis tilt state detection unit 32 at Step S12.

Subsequently, at Step S13, the support determination unit 33 determines whether or not the axis tilt state has been detected based on the axis tilt state determination information. When the axis tilt state has not been detected yet (S13: No), at Step S14, the support determination unit 33 transmits the performing allowance (permission) instruction of the driving support control to the driving support ECU 40. The driving support control, including the PCS control, is performed based on the object information transmitted from the radar device 10.

Subsequently, at Step S15, the support determination unit 33 sets an axis tilt continuation timer value t to "0". As described later, this axis tilt continuation timer value t represents a time period for which the axis tilt is continuously being detected. When the ignition switch is turned on, the axis tilt continuation timer value t is set to "0".

Subsequently, at Step S16, the support determination unit 33 sets an axis tilt trip count value C to "0". As described later, the axis tilt trip count value C represents a count value of the number of trips in each of which a "situation where the axis tilt state is detected" continues for a predetermined time period or longer. It should be noted that one period/duration from a time point at which the ignition switch is turned on to a time point at which that ignition switch is turned off is defined as one trip. Thus, the number of the trips represents the number of occurrences of the above period.

After the support determination unit 33 completes the process of Step S16, the support determination unit 33 tentatively terminates the present routine. When the axis tilt state detection unit 32 detects the axis tilt state (S13: Yes) "while the support determination unit 33 repeatedly performs the present routine every time a predetermined time period elapses", the support determination unit 33 transmits a temporary/tentative performing prohibition instruction of the drive support control to the driving support ECU 40 at Step S17. As understood from a description described later, the reason why the word "temporary (tentative)" is used/included in the above described performing prohibition instruction is that the driving control is allowed (permitted) to be performed when the axis tilt state becomes undetected before the axis tilt error is confirmed, even if the time point at which the axis tilt state becomes undetected is in the trip (during a time period for which the ignition switch is in the on-state).

Subsequently, the support determination unit 33 performs the axis tilt error confirmation routine (FIG. 8) at Step S20. When the axis tilt error confirmation routine starts, the support determination unit 33 determines whether or not a vehicle velocity condition is established at Step S21. In the present embodiment, it is determined that the vehicle velocity condition is established when the vehicle velocity detected by the vehicle velocity sensors is equal to or higher than a predetermined threshold velocity (>0). When the vehicle velocity condition is not established (S21: No), the support determination unit 33 tentatively terminates the axis tilt error confirmation routine. In this case, the support determination unit 33 returns to Step S11 of the driving support determination routine (shown in FIG. 7) which is a main routine. Therefore, the above described processes are repeatedly performed.

When the support determination unit 33 determines that the vehicle velocity condition is established (S21 shown in FIG. 8: Yes), the support determination unit 33 increments the axis tilt continuation timer value t by "1" at Step S22. Subsequently, at Step S23, the support determination unit 23 determines whether or not the axis tilt continuation timer value t is equal to or greater than a continuation determination time period tref. For example, the continuation determination time period tref is set to a value corresponding to "900 seconds". When the axis tilt continuation timer value t is smaller than the continuation determination time period tref (S23: No), the support determination unit 33 tentatively terminates the axis tilt error confirmation routine to return to Step S11 in the driving support determination routine (shown in FIG. 7) which is the main routine.

When the axis tilt continuation timer value t reaches the continuation determination time period tref after the above described processes are repeatedly performed, the support determination unit 33 determinates whether or not a trip count flag Fc is "0" (Fc=0) at Step S24 (shown in FIG. 8). When the ignition switch is turned on, the trip count flag Fc is reset (that is, Fc is set to zero, Fc←0).

When the trip count flag Fc is "0" (Fc=0) (S24: Yes), the support determination unit 33 increments the axis tilt trip count value C by "1" at Step S25. Subsequently, at Step S26, the support determination unit 33 sets the trip count flag Fc to "1". Therefore, when the value of the trip count flag Fc, the trip count flag Fc indicates that the axis tilt continuation timer value t has become equal to or greater than the continuation determination time period tref during a current trip (while the ignition switch is in the on-state). As the axis tilt continuation timer value t is greater, accuracy of detecting the axis tilt state (reliability in determining that the axis tilt state has occurred) is higher. Therefore, the continuation determination time period tref is set to a time period sufficient to guarantee/secure the accuracy of (or reliability in) detecting the axis tilt state. As a result, the axis tilt state can be detected more accurately/reliably.

Subsequently, at Step S27, the support determination unit 33 determines whether or not the axis tilt trip count value C is equal to or greater than an axis tilt error determination threshold Cref. In the present embodiment, the axis tilt error determination threshold Cref is set to "12". When the axis tilt trip count value C is smaller than the axis tilt error determination threshold Cref (S27: No), the support determination unit 33 tentatively terminates the axis tilt error confirmation routine to return to Step S11 in the driving support determination routine (shown in FIG. 7) which is the main routine.

When the axis tilt trip count value C reaches the axis tilt error determination threshold Cref (S27: Yes) after the above described processes are repeatedly performed, the support determination unit 33 stores the axis tilt error code in the diagnosis unit 34 to confirm (an occurrence of) the axis tilt error of the radar device 10, at Step S28. After the process of Step S28, the support determination unit 33 tentatively terminates the axis tilt error confirmation routine to return to Step S11 in the driving support determination routine (shown in FIG. 7) which is the main routine.

For example, when the radar axis of the radar sensor 20 tilts in either upward or downward in relation to a proper direction, the axis tilt state is continuously detected. Therefore, when the number of trips, each of which is the trip where "the axis tilt continuation timer value t becomes equal to or greater than the continuation determination time period tref", reaches "12", the axis tilt error is confirmed. On the other hand, in the case where the temporary axis tilt state due to the adherent of the snow or the like to the outer plate of the radar sensor 20 is detected, the axis tilt state becomes undetected when the cause for that temporary axis tilt state (the adherent of the snow or the droplet) is removed (disappears) (and thus, since the number of trip does not reach "12", the axis tilt error is not confirmed).

For example, when the snow has adhered to the vehicle, the driver may remove that snow by himself/herself. In general, the driver removes the snow while the ignition switch is in the off-state. The snow or the rain droplet which adheres to the own vehicle may be removed (disappear) owing to weather change while the vehicle continues to be parked. Therefore, in the case where the axis tilt state has been detected due to the adherent of the snow or the rain droplet, it is determined that the axis tilt state has disappeared when the number of the trips reaches a predetermined number which is smaller than the threshold Cref (=12) after the axis tilt state was initially detected.

In view of the above, in the axis tilt error confirmation routine, "maximum value of the number of the trips within which the cause for the temporary axis tilt state (such as the snow, and the rain droplet) is expected to be removed is set to "11", each of the trips being a trip in which the axis tilt continuation timer value t is equal to or greater than the continuation determination time period tref". That is, the axis tilt error determination threshold Cref is set to "12" based on the expectation (experimental expectation) that the axis tilt state disappears before the number of the trips reaches the above described value "12" if that axis tilt state has occurred due to the cause for the temporary axis tilt state.

Therefore, the axis tilt error is not confirmed before the axis tilt trip count value C reaches "12". When the axis tilt state becomes undetected before the axis tilt error is confirmed (i.e., before the axis tilt trip count value C reaches "12") (S13: No), the support determination unit 33 proceeds to Step S14 (shown in FIG. 7). Thereby, the performing allowance/permission instruction of the driving support control is transmitted to the driving support ECU 40 at a time point at which the axis tilt state becomes undetected.

On the other hand, when the axis tilt trip count value C reaches "12", it can be determined that the radar axis is actually tilts in relation to the proper direction, and thus, the axis tilt error is confirmed.

After the axis tilt error is confirmed, the support determination unit 33 makes a "Yes" determination at Step S11 in the driving support determination routine (shown in FIG. 7). In this case, the support determination unit 33 proceeds to Step S30 to transmit an "axis tilt error confirmation instruction (axis tilt error confirmation information) to the driving support ECU 40. The axis tilt error confirmation instruction represents that the axis tilt error has been confirmed. When the support determination unit 33 transmits the axis tilt error confirmation instruction, the support determination unit 33 tentatively terminates the driving support determination routine. The support determination unit 33 repeatedly executes the driving support determination routine, every time the predetermined calculation cycle elapses.

The axis tilt error code stored in the diagnosis unit 34 is not deleted/erased during at least one trip. Therefore, after the axis tilt error is confirmed, the support determination unit 33 repeats to transmit the axis tilt error confirmation instruction to the driving support ECU 40. That is, after the axis tilt error is confirmed in the certain trip, even if the axis tilt becomes undetected during that certain trip, the support determination unit 33 repeats to transmit the axis tilt error confirmation instruction. Thereafter, when the ignition switch is operated (turned on after it is turned off) so that the vehicle starts, the support determination unit 33 determines whether or not the axis tilt error code has been stored in the diagnosis unit 34 at Step S11 shown in FIG. 7. When the axis tilt error code has not been stored, the processes after Step S12 are performed. In other words, in the case where the axis tilt error code is deleted/erased when "an operation for changing the state of the ignition switch from the on-state to the off-state is performed" in the previous trip for which the axis tilt state has disappeared, or, when "an operation for changing the state of the ignition switch from the off-state to the on-state is performed to start a next trip successive to the previous trip, the processes after Step S12 are performed. In contrast, when the axis tilt error code has been stored, in other words, when the axis tilt state has not disappeared during the previous trip, the process of Step S30 is repeatedly performed.

Figure 9:
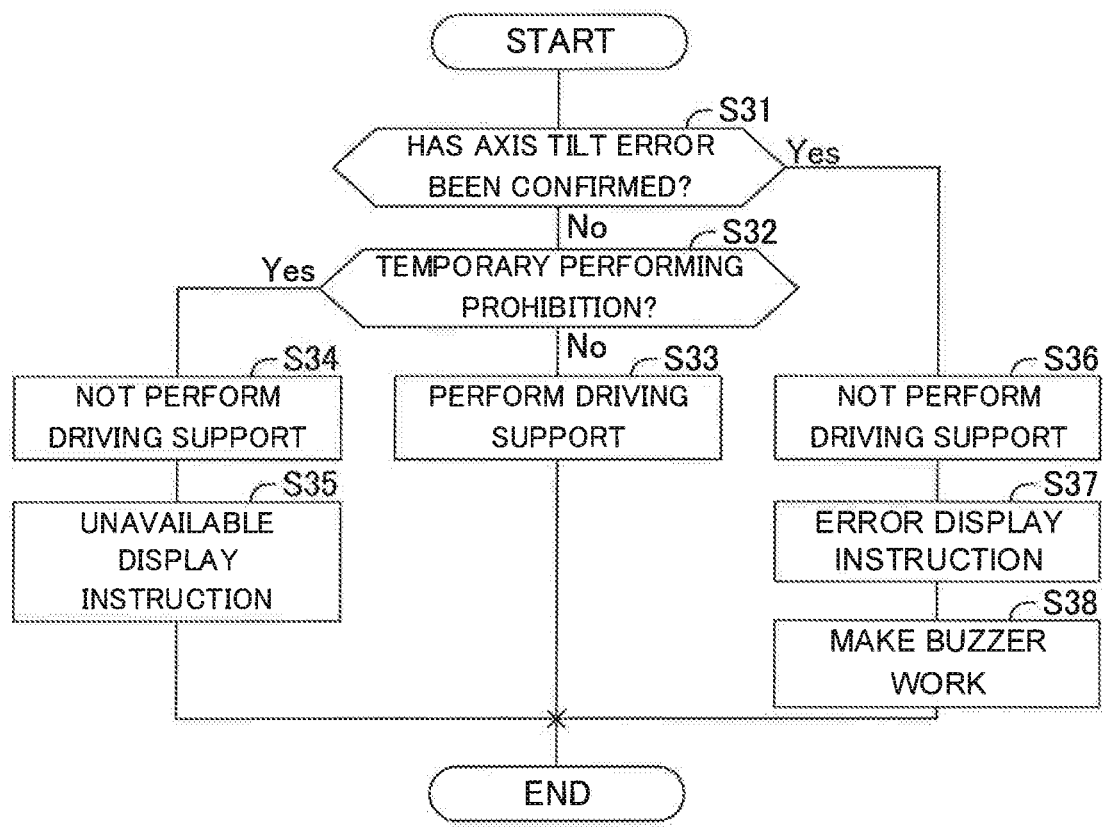
FIG. 9 is a flowchart illustrating a support performing switch routine.

Processes, performed by the driving support ECU 40, corresponding to instructions transmitted from the support determination unit 33 will next be described. A support switching routine executed by the driving support ECU 40 is shown in FIG. 9. Support switching routine is repeatedly executed, every time a predetermined calculation cycle elapses, while the ignition switch is in the on-state.

When the support switching routine starts, the driving support ECU 40 determines whether or not the axis tilt error has been confirmed at Step S31, through determining whether or not the driving ECU 40 has been receiving the axis tilt error confirmation instruction from the support determination unit 33. When the axis tilt error has not been confirmed (S31: No), the driving support ECU 40 determines whether or not the driving support ECU 40 has been receiving the temporary/tentative performing prohibition instruction from the support determination unit 33 at Step S32. When the driving support ECU 40 has been receiving the temporary performing prohibition instruction from the support determination unit 33 (S32: No), that is, when the driving support ECU 40 has been receiving the performing allowance/permission instruction, the driving support ECU 40 performs the driving support control at Step S33 when necessary. That is, the driving support ECU 40 performs the PCS control when necessary.

Basically, the PCS control is a control which should be always allowed to be performed while the own vehicle is traveling. The probability that the own vehicle collides with the obstacle is determined/calculated based on the object information transmitted from the radar device 10 while the PCS control is allowed to be performed. When the collision probability becomes high, a process (i.e., an alert, a brake pressuring assist, an automatic brake, or the like) corresponding to a level of the collision probability is performed.

On the other hand, when the driving support ECU 40 has been receiving the temporary performing prohibition instruction from the support determination unit 33 (S32: Yes), the driving support ECU 40 stops/cancels the driving support control based on the object information at Step S34. That is, the driving support ECU 40 stops/cancels the PCS control. Subsequently, at Step S35, the driving support ECU 40 transmits an unavailable display instruction of a pre-crash system (referred to as a "PCS system") to the meter ECU 60.

In this case (i.e., when the meter ECU 60 receives the unavailable display instruction), as shown in a temporary performing prohibition column of a table shown in FIG. 10, the meter ECU 60 displays a character message saying that "pre-crash safety is unavailable now" on MID provided in the display unit 61 with intermittently flashing the PCS indicator. In this case, the meter ECU 60 keeps the master caution lump at/in a light off state, and does not make the buzzer 80 work.

The message displayed on the MID and the intermittently flash of the PCS indicator can inform the driver that the driver cannot receive the driving support of the PCS system. In this case, the master caution lump is kept at/in the light off state, therefore, the driver does not recognizes that an error in the PCS system has occurred.

On the other hand, when the axis tilt error has been confirmed (S31: Yes), the driving support ECU 40 stops/cancels the driving support control including the PCS control based on the object information at Step S36. Subsequently, at Step S37, the driving support ECU 40 transmits an error display instruction of the PCS system to the meter ECU 60 to make the buzzer 80 work at Step S38.

When the meter ECU 60 receives the error display instruction, as shown in an axis tilt error determination column of the table shown in FIG. 10, the meter ECU 60 displays a character message that "Pre-Crash Safety does not work. Please inspect/check it at a dealer." on the MID provided in the display unit 61. At the same time, the meter ECU 60 flashes the PCS indicator intermittently, and turns on the master caution lump. In some embodiments, the buzzer 80 is made to stop working at an appropriate time point.

The message displayed on the MID, the master caution lump which is in the on-state, and the intermittently flash of the PCS indicator, and the flashing PCS indicator can inform the driver that the driver cannot receive the driving support of the PCS system and that the vehicle requires the inspection because the failure has occurred in the PCS system.

After executing the process(es) corresponding to the instruction transmitted from the support determination unit 33, the driving support ECU 40 tentatively terminates the support switching routine. Thereafter, the driving support ECU 40 repeats the support switching routine.

As described above, when the driving support device according to the embodiment detects the axis tilt state, the driving support device temporarily prohibits itself from performing the driving support control without confirming the axis tilt state immediately. Therefore, the driving support control having a low accuracy due to the axis tilt state can be avoided. After the driving support device detected the axis tilt state, the driving support device continues reading out the axis tilt state determination information to determine whether or not the axis tilt is state has disappeared during/within the predetermined time period within which the cause for the temporary axis tilt state is expected to be removed through the axis tilt error confirmation routine. This predetermined time period corresponds to the time period in which the trip count value C is smaller than the error determination threshold Cref.

When it is determined that the axis tilt state has disappeared before the predetermined time period elapses, the driving support device cancels the prohibition of performing the driving support control. Therefore, when the cause for the temporary axis tilt state has been removed, the driver can receive the driving support having a high accuracy. In this case, the driving support device returns a display state of the display unit 61 to a normal state. In other words, the driving support device returns the display state from the display state shown in the temporary performing prohibition column of the table in FIG. 10 to the display state shown in the performing allowance column (a non-display state) of the table in FIG. 10. Therefore, the driver can recognize that the driver can receive the driving support.

On the other hand, in the case where the axis tilt state occurs due to a cause other than the temporary cause (that is, the cause for the temporary axis tilt state), the driving support device confirms the axis tilt error and stores the axis tilt error code in the diagnosis unit 34 when it is determined that the "predetermined time period within which the cause for the temporary axis tilt state is expected to be removed (that is, the period corresponds to the time period in which the trip count value C is smaller than the error determination threshold Cre)" has elapsed through the axis tilt error confirmation routine. When the driving support device confirms the axis tilt error, the driving support device prohibits itself from performing the driving support control until at least (or at earliest) the ignition switch is turned off regardless of the detection result of the axis tilt state by the axis tilt state detection unit 32 (S11: Yes, S30). Therefore, the driving support device can certainly prohibit itself from performing the "driving support control having the low accuracy due to the axis tilt state".

In this manner, according to the driving support device in this embodiment, when and after the axis tilt state has occurred initially due to the temporary cause, the driver can start to receive the driving support again from a time point at which the temporary cause is removed (or disappears). Therefore, the driving support device can avoid the driving support control which the driver can receive from being limited beyond necessity.

The message stating that the inspection is necessary is not displayed on the display unit 61 while the driving support device temporarily prohibits itself from performing the driving support control without confirming the axis tilt state immediately. The driver is not informed of a necessity for the vehicle inspection, more than necessary. This can prevent a situation where such message annoys the driver from occurring. On the other hand, when the axis tilt error has confirmed, this driving support device can urge the driver to have the own vehicle inspected. Therefore, safety and usability can be improved.

When the number (the axis tilt trip count value C) of trips in each of which the continuation condition is established becomes equal to or greater than the error determination threshold Cref, it is determined that the "predetermined time period within which the cause for the temporary axis tilt state is expected to be removed" has elapsed. The continuation condition is established when the axis tilt continuation timer value t is equal to or greater than the continuation determination time period tref during one trip. Therefore, the timing at which the axis tilt error is confirmed can be determined appropriately, and thus, the safety and the usability can be further improved.

Figure 11:
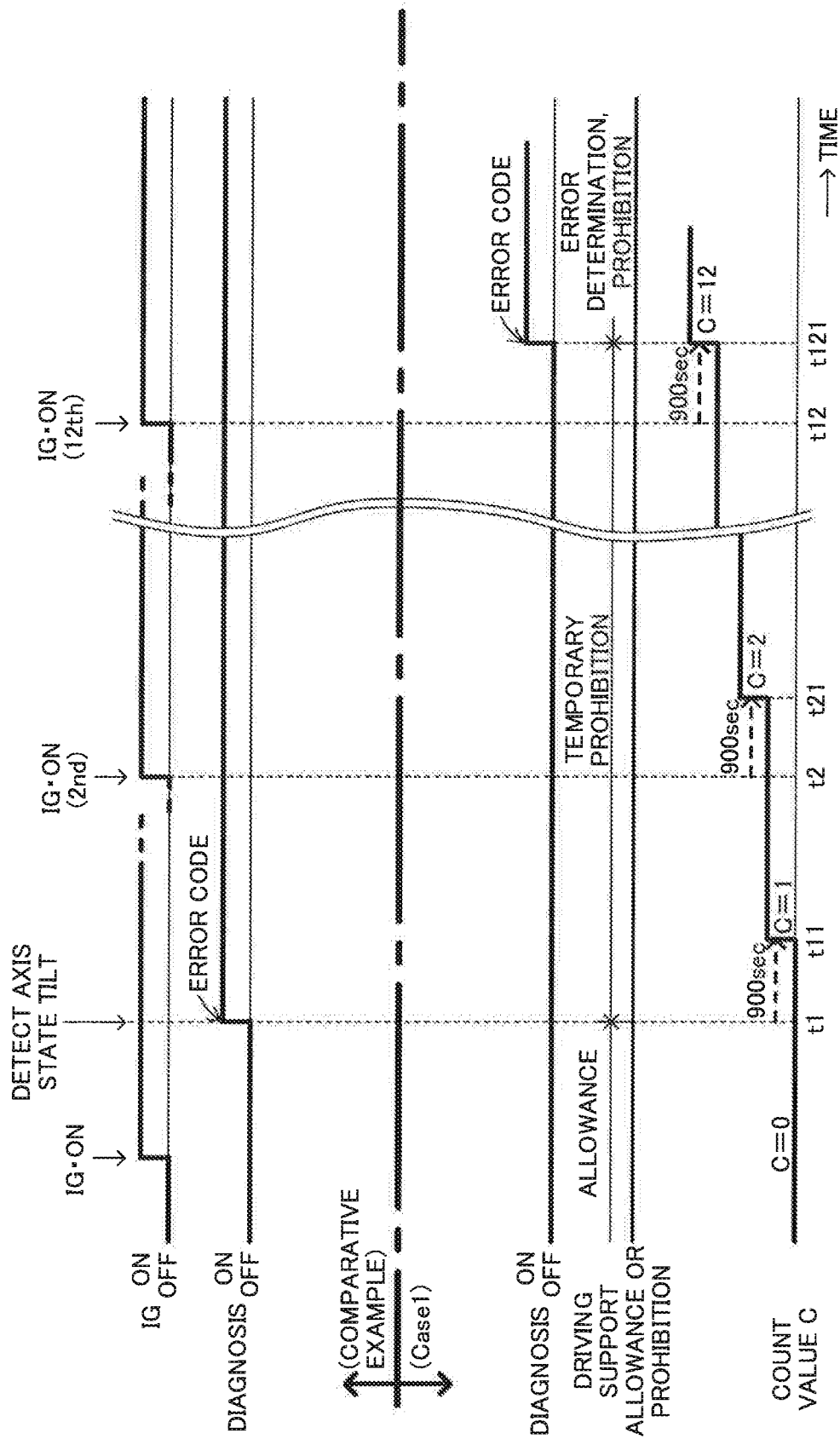

Here, "another driving support device (hereinafter, referred to as a "comparative device") which is configured to confirm the axis tilt error at a timing at which the axis tilt state is detected" and "the driving support device (hereinafter, referred to as a "present device") according to the above described embodiment" are compared with each other. FIG. 11 shows a timing at which the comparative device confirms the axis tilt error and a timing at which the present device confirms the axis tilt error. Each of the timings is a timing at which the axis tilt error code is stored. A timing chart according to the comparative device is shown in an upper side of FIG. 11, and a timing chart (Case1) according to the present device is shown in a lower side of FIG. 11. It is assumed that non-temporary axis tilt state (that is, an axis tilt state other than the axis tilt state due to the cause for the temporary axis tilt state) is detected in the example shown in FIG. 11.

When the comparative device detects the axis tilt state at a time point t1, the comparative device stores the diagnosis error code representing that the axis tilt error at the time point t1. That is, the comparative device confirms the axis tilt error at the time point t1. Therefore, the comparative device stops/cancels the driving support control from the time point t1. In addition, the comparative device switches the display state of the display unit 61 from the state shown in the performing allowance column of the table in FIG. 10 to the display state shown in the axis tilt error confirmation column of the table in FIG. 10 at the time point t1.

In contrast, at the time point t1 at which the axis tilt state is detected in the Case 1, the present device does not store the axis tilt error code in the diagnosis unit 34, and outputs/generates the temporary performing prohibition instruction to the driving support ECU 40. Furthermore, at the time point t1, the present device starts counting the continuation time period in which the axis tilt state is being detected while the own vehicle travels. In addition, the present device switches the display state of the display unit 61 from the display state shown in the performing allowance column of the table in FIG. 10 to the display state shown in the temporary performing prohibition column of the table in FIG. 10 at the time point t1.

When the axis tilt continuation time value t reaches the continuation determination time period tref (for example, 900 seconds) at the time point t1, the present device increments the axis tilt trip count value C by "1". As a result, the axis tilt trip count value C changes from "0" to "1". The axis tilt trip count value C continues being stored/held even if the ignition switch is turned off.

Thereafter, when the ignition switch is turned on again at a time point t2 after the ignition switch is turned off, the present device starts counting the continuation time period in which the axis tilt is being detected while the own vehicle travels. When the axis tilt continuation timer value t reaches the continuation determination time period tref at a time point t21, the present device increments the axis tilt trip count value C by "1". The axis tilt trip count value C becomes "2".

When the ignition switch is turned on at the 12th times (at a time point t12) after those processes are repeatedly performed, the present device starts counting the continuation time period in which the axis tilt is being detected while the own vehicle travels, in the same manner as described above. Thereafter, when the axis tilt continuation timer value t reaches the continuation determination time period tref so that the axis tilt trip count value C changes from "11" to "12" at a time point t121, the present device stores the axis tilt error code representing that the axis tilt error has occurred in the diagnosis unit 34. At the same time, the present device transmits the axis tilt error confirmation instruction to the driving support ECU 40. Thus, the present device switches the display state of the display unit 61 from the display state shown in the temporary performing prohibition column of the table in FIG. 10 to the display state shown in the axis tilt error confirmation column of the table in FIG. 10

Figure 12:
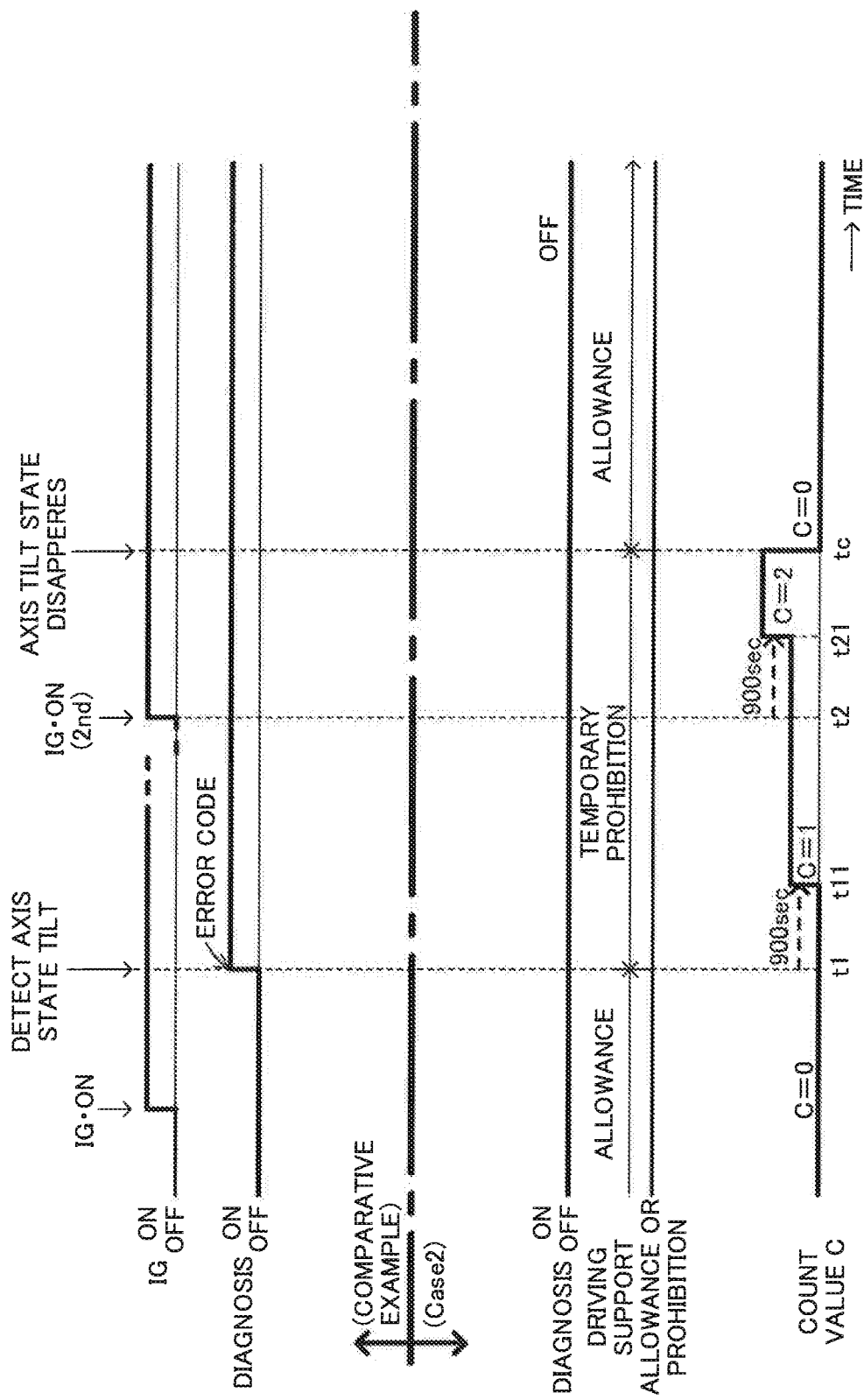

Still another comparative example will be next described with reference to FIG. 12. In this example, it is assumed that the temporary axis tilt state is detected, and thereafter, the axis tilt state is removed (disappears) at a time point tc during the second trip.

Even when the axis tilt has disappeared at the time point tc, the diagnosis error code representing that the axis tilt error has occurred has been stored when the second trip error starts, in other words, at the time point t2 at which the ignition switch is turned on at the second times. Therefore, the comparative device continues canceling/stopping the driving support control until at earliest the second trip ends. Further, the comparative device continues displaying the axis tilt error confirmation column shown of the table in FIG. 10.

In contrast, in the present device (in Case 2), the axis tilt state determination information transmitted/acquired from the axis tilt state detection unit 32 changes from an "axis tilt state detection" to a "no axis tilt state detection" at the time point tc. At the time point tc, in the present device, the axis tilt trips count value C is set to "0", and the performing allowance instruction is transmitted to the driving support ECU 40 instead of the temporary performing prohibition instruction which has been transmitted. Therefore, the driving support control is restarted. In addition, the present device switches the display state of the display unit 61 from the display state shown in the temporary performing prohibition column of the table in FIG. 10 to the display state shown in the performing allowance column of the table in FIG. 10, at the time point tc.

The driving support device according to the present embodiment and the control method of the driving support device have been described. The present invention is not limited to the above-described embodiment, and can adopt various modifications.

For example, according to the present embodiment, although all components of the driving support device are installed in the vehicle, in some embodiments, some of the components are installed in the vehicle and the other components are installed outside the vehicle. For example, the other components are installed in an external server. In this case, the driving support device 1 further comprises a communication device which communicates with the external server through wireless communication. The external server executes some of the processes which are executed by the object detection ECU of the above-described embodiment. For example, the driving support device 1 transmits the axis tilt state detection information to the external server. The external server executes the driving support determination routine based on the axis tilt state detection information. The external server transmits, to the driving support device 1 (the driving support ECU 40), instructions (the performing allowance instruction, the temporary performing prohibition instruction or the axis tilt error confirmation instruction) which are obtained through the driving support determination routine.

In the above embodiment, the axis tilt error is confirmed when the condition is established, the condition being a condition satisfied when the number of the trips in each of which the axis continuation timer value t is equal to or greater than the continuation determination time period tref reaches the predetermined value (e.g., "12"). However, that condition is arbitrarily set in some embodiments. For example, the support determination unit 33 counts the number of the trips after the axis tilt state was initially detected, and determines whether or not the axis tilt state has been removed (or has disappeared) when the number of the trips reaches the predetermined value. When it is determined that the axis tilt state has been removed (or has disappeared)

when the number of the trips reaches the predetermined value, the support determination unit 33 determines that the predetermined time period has elapsed so as to confirm the axis tilt error. In this case, the processes of S21 through S23 in the axis tilt error confirmation routine shown in FIG. 8 are omitted and the processes of S24 through S28 are executed.

In some embodiments, the condition for confirming the axis tilt error is set based solely on the continuation time period for which the axis tilt continues being detected. More specifically, the support determination unit 33 counts the continuation time period for which the axis tilt state continues being detected. When the axis tilt continuation time period reaches the predetermined time, the support determination unit 33 determines that the predetermined time period has elapsed so as to confirm the axis tilt error. In this case, for example, the processes of S24 through S27 are omitted in the axis tilt error confirmation routine shown in FIG. 8. In some embodiments, the process of Step 21 is omitted. In some embodiments, the axis tilt continuation timer value t is stored in the non-volatile memory such that the axis tilt continuation timer value t is set to "0" when the axis tilt error is confirmed, and such that the axis tilt continuation timer value t is not set to "0" when the ignition switch is turned on. In this case, the continuation determination time period tref is set to a value longer than the above-described value of the present embodiment.

Although the continuation determination time period is set to 900 seconds, and the axis tilt error determination threshold Cref which is a threshold of the axis tilt trip count value C is set to "12" in the present embodiment, these values are set to any appropriate values in some embodiments.

In some embodiments, the driving support device detects the axis tilt state in a horizontal direction in addition to the axis tilt state in the in the up-down (vertical) direction. The present disclosure can appropriately adopt the various well-known methods for detecting the axis tilt state.

In the present embodiment, when the axis tilt has been removed (has disappeared), (in other words, when the axis tilt amount θ falls within the permissible range ($|θ|≤θref$)) after the axis tilt error was confirmed, the axis tilt error code is reset (deleted, erased) at the time point of the operation of the ignition switch (the operation for changing the states of the ignition switch from the off-state to the on-state or the operation for changing the states of the ignition switch from the on-state to the off-state). In some embodiments, the axis tilt error code reset timing is not limited to the above-described timings. For example, in some embodiments, the axis tilt error code is reset (deleted, erased) when a specific operation is performed using a specific tool after the radar axis is adjusted at a dealer, an auto-repair shop, or the like. In some embodiments, when an operation unit which is installed in the vehicle receives a specific operation, the axis tilt error code is reset.

In addition, although the radar device 10 is attached at the center in the vehicle width direction in the front end of the vehicle body in the present embodiment, the radar device 10 is attached at any location depending on the driving support control. For example, the radar device 10 is attached at a front left corner of the vehicle and/or a front right corner of the vehicle and a rear left corner of the vehicle and/or a rear right corner of the vehicle. In some embodiments, the radar device 10 is attached at the center in the vehicle width direction in a rear end of the vehicle.

Although the radar device 10 is attached inside of the outer plate in the present embodiment, the radar device 10 is not necessarily attached inside of the outer plate. For example, in some embodiments, the radar device has a protection cover. The protection cover is arranged in a transmission/emission direction of the radio waves. The protection cover is directly attached on the outer circumferential surface of the vehicle. The snow or the rain droplet, or the like, may adhere to the protection cover. Therefore the present disclosure is applied to the above described radar device 10 having the protection cover.

What is claimed is:

1. A driving support device comprising:
    a radar installed in a vehicle, for detecting an object in a predetermined area; and
    an electronic control unit comprising a CPU, a ROM, a RAM, a no-volatile memory, an interface I/F, wherein the electronic control unit is configured to
    perform a driving support control for supporting driving of a driver based on object information on the object detected by the radar;
    detect an axis tilt state of the radar;
    prohibit from performing the driving support control based on the object information without confirming an axis tilt error, at and after a time point at which the radar axis tilt state is detected;
    determine whether or not the axis tilt state of the radar has disappeared before a predetermined time period elapses from the time point at which the radar axis tilt state is initially detected, the predetermined time period being a time period within which a cause for a temporary axis tilt state is expected to be removed;
    stop prohibiting the driving support control, when the radar axis tilt state has disappeared before the predetermined time period elapses; and
    determine whether or not the predetermined time period has elapsed using a continuation time period during which the radar axis tilt state continues being detected.

2. The driving support device according to claim 1, wherein the electronic control unit is further configured to inform that the driving support control is unavailable without informing that an inspection is necessary, when prohibiting from performing the driving support control based on the object information without confirming the axis tilt error.

3. The driving support device according to claim 1, wherein the electronic control unit is further configured to confirm the axis tilt error and to prohibit from performing the driving support control until a predetermined reset operation is detected, when the radar axis tilt state has not disappeared before the predetermined elapses.

4. The driving support device according to claim 3, wherein the electronic control unit is further configured to inform that the driving support control is unavailable and an inspection is necessary, when prohibiting from performing the driving support control while the radar axis tilt error is confirmed.

5. A driving support device comprising:
    a radar installed in a vehicle, for detecting an object in a predetermined area; and
    an electronic control unit comprising a CPU, a ROM, a RAM, a no-volatile memory, an interface I/F, wherein the electronic control unit is configured to
    perform a driving support control for supporting driving of a driver based on object information on the object detected by the radar;
    detect an axis tilt state of the radar;
    prohibit from performing the driving support control based on the object information without confirming an axis tilt error, at and after a time point at which the radar axis tilt state is detected;

determine whether or not the axis tilt state of the radar has disappeared before a predetermined time period elapses from the time point at which the radar axis tilt state is initially detected, the predetermined time period being a time period within which a cause for a temporary axis tilt state is expected to be removed;

stop prohibiting the driving support control, when the radar axis tilt state has disappeared before the predetermined time period elapses; and determine whether or not the predetermined time period has elapsed using the number of trips after the axis tilt is initially detected, each of the trips being one period for which an ignition switch continues being in an on state.

6. The driving support device according to claim 5, wherein the electronic control unit is further configured to count an axis tilt continuation time period which is a period for which the radar axis tilt state continues being detected;

determine whether or not a continuation condition is established, the continuation condition being a condition satisfied when the axis tilt continuation time period is equal to or longer than a predetermined time period in one trip being one period for which an ignition switch continues being in an on state;

count the number of the trips in each of which the continuation condition is established; and determine that the predetermined time period has elapsed while the axis tilt state does not disappear, when the number of the trips reaches a predetermined number.

7. A control method of a driving support device including:

a detection step for determining whether or not an axis tilt state of a radar which is installed in a vehicle and which is able to detect an object in a predetermined area occurs;

a prohibition step for prohibiting the driving support device from performing a driving support control for supporting driving of a driver of the vehicle based on object information at and after a time point at which the axis tilt is initially detected in the detection step without confirming an axis tilt error;

a determination step for determining whether or not the axis tilt state has disappeared before a predetermined time period elapses from the time point at which the axis tilt is initially detected; and a cancel step for stopping prohibiting the driving support device from performing the driving support control, when it is determined that the axis tilt state has disappeared before the predetermined time period elapses in the determination step, wherein the determination step further determines whether or not the predetermined time period has elapsed using a continuation time period during which the radar axis tilt state continues being detected.

* * * * *